(12) United States Patent
Mason

(10) Patent No.: US 6,240,985 B1
(45) Date of Patent: Jun. 5, 2001

(54) FILLING DEVICE FOR SHIPPING CONTAINER

(75) Inventor: J. Bradley Mason, Pasco, WA (US)

(73) Assignee: Studsvik Inc, Erwin, TN (US)

( * ) Notice: Subject to any disclaimer, the term of this patent is extended or adjusted under 35 U.S.C. 154(b) by 0 days.

(21) Appl. No.: 09/511,035

(22) Filed: Feb. 23, 2000

(51) Int. Cl.⁷ ................................................ B01D 35/00
(52) U.S. Cl. ........................... 141/198; 141/383; 210/97; 210/323.2; 210/416.1; 210/418; 210/454; 210/345; 210/220; 210/212; 210/86.1
(58) Field of Search .................... 210/97, 323.2, 210/345–347, 416.1, 418, 454; 141/346, 383, 384, 386, 198; 137/590; 220/86.1, 212

(56) References Cited

U.S. PATENT DOCUMENTS

| | | | |
|---|---|---|---|
| 519,275 | * 5/1894 | Sellenscheidt et al. | 210/345 |
| 1,775,982 | * 9/1930 | Waters et al. | 210/454 |
| 1,999,913 | * 4/1935 | Merritt | 210/454 |
| 2,017,277 | * 10/1935 | Gatewood | 210/454 |
| 2,293,041 | * 8/1942 | Borden | 210/416.1 |
| 2,657,806 | * 11/1953 | Launder | 220/378 |
| 2,872,044 | * 2/1959 | Kasten | 210/323.2 |
| 3,362,535 | * 1/1968 | Kasten | 210/323.2 |
| 3,502,214 | * 3/1970 | Mills et al. | 210/323.2 |
| 3,513,090 | * 5/1970 | Migule et al. | 210/347 |
| 4,419,234 | * 12/1983 | Miller et al. | 210/323.2 |
| 4,936,986 | * 6/1990 | Tarves, Jr. | 210/347 |

* cited by examiner

Primary Examiner—J. Casimer Jacyna
(74) Attorney, Agent, or Firm—Michael A Mann; Nexsen Pruet Jacobs & Pollard, LLC

(57) ABSTRACT

A remote filling device for use with a shipping container is described. A shipping container with specialized connections can be remotely opened using a single lightweight tool using a single drive screw latching mechanism. The actuation of the latching mechanism also compresses seals between the filling device and dewatering connections on the container. Dewatering is accomplished using reusable, backwashable filters. Once the container is filled and dewatered, the filling device is remotely removed and a lightweight, reusable lid is remotely scaled to the container using a single screw latch remotely actuated.

19 Claims, 2 Drawing Sheets

FILLING DEVICE FOR SHIPPING CONTAINER

1. FIELD OF THE INVENTION

The present invention relates generally to devices for filling shipping containers, and, more specifically, to devices that fill shipping containers with radioactive materials.

2. BACKGROUND OF THE INVENTION

Radioactive wastes are generated by a number of industrial, medical and electric power generating activities. Periodically, these wastes are processed and prepared for shipment to a disposal site. Because of their radioactive nature, it is important to limit the exposure of employees who process and handle them. It is also important to process the wastes so that they remain stable during shipping and disposal until the radionuclides present decay to nominal levels. Therefore, techniques have been developed to process wastes quickly and efficiently.

There exists a variety of plastic and metal containers used to ship and store radioactive wastes. In particular, certain sludge and ion exchange media slurry wastes are dewatered in shipping containers that are provided with one or more sets of dewatering filters. For a slurry application, an empty container that is already fitted on the inside cavity with dewatering filters and headers is connected to a filling device. The dewatering headers inside the container are manually connected to the corresponding dewatering connections on the filling device, commonly called a fillport. The fillport dewatering connections are connected to a pump or vacuum source.

To fill the container, the waste slurry is pumped through the fillport into the container. As the water-slurry level increases inside the container, the dewatering filters are gradually covered. A float type level transmitter or switch is provided to prevent overfilling the container. A pump or vacuum source is energized to draw excess water from inside the container through the dewatering filters, internal headers, and fillport connections. The slurry is thus dewatered to the extent necessary for shipment and disposal. Once the excess or "free" water is removed from the container, the container contains only dewatered, solid materials. The fillport is then lifted and the dewatering lines that are connected to the dewatering headers inside the container and the fillport are manually disconnected.

The filled container is then closed by putting a lid over the opening. The lids for plastic containers have external threads. The lid is then screwed in the opening on top of the container that has a mating internal threads. Lids of metal containers are typically snapped or bolted on Fillports typically are held to the container simply by their weight or perhaps by two or more hold-down bolts or toggles. The bolted fillport is secured by manually threading bolts into mating threaded holes on the container. The toggle type fillport is secured by means of two or more toggles or cam arms provided with manual or air-cylinder-operated lever arms.

Dewatering connections typically comprise mating cam and groove type fittings, such as CAM-LOK fittings by Dixon. Occasionally other "quick-disconnect" type fittings are used, such as hydraulic fittings by Parker. These type fittings still all require manual (and literally, handson) make-up and disassembly.

Dewatering filters typically comprise disposable plastic depth-type filters Following each dewatering application the filters that become plugged are removed from the container and discarded. New filters are then installed in the containers that are to be reused.

A variety of such containers, fillports and lids are available from several manufacturers including Chem-Niuclear, Nukem, and Studsvik.

SUMMARY OF THE INVENTION

The purpose of this invention is to provide a container with mating fillport and lid that eliminates any manual intervention to: (1) set and secure the fillport to the container, (2) connect and seal the container dewatering headers to the fillport dewatering connections; (3) disconnect the dewatering connections and remove the fillport following the completion of container filling and dewatering; and (4) set and secure the lid. In addition, reusable filters are provided that can be backwashed using a combination of air and water to regenerate the filters for reuse.

Eliminating the manual work for connecting and disconnecting the fillport and container results in significant savings in personnel radiation exposure and greater convenience to the operating personnel. Eliminating handling and filter costs for replacing the filter elements makes reuse of the container less expensive. Additional cost savings are achieved from reduced use of the protective clothing and respirators that operations personnel must wear to manually perform assembly and disassembly operations.

Other features and their advantages will be apparent to those skilled in the art of handling radioactive wastes from a careful reading of the Detailed Descriptive of Preferred Embodiments, accompanied by the following drawings.

DETAILED DESCRIPTION OF A PREFERRED EMBODIMENT

Figure 1:
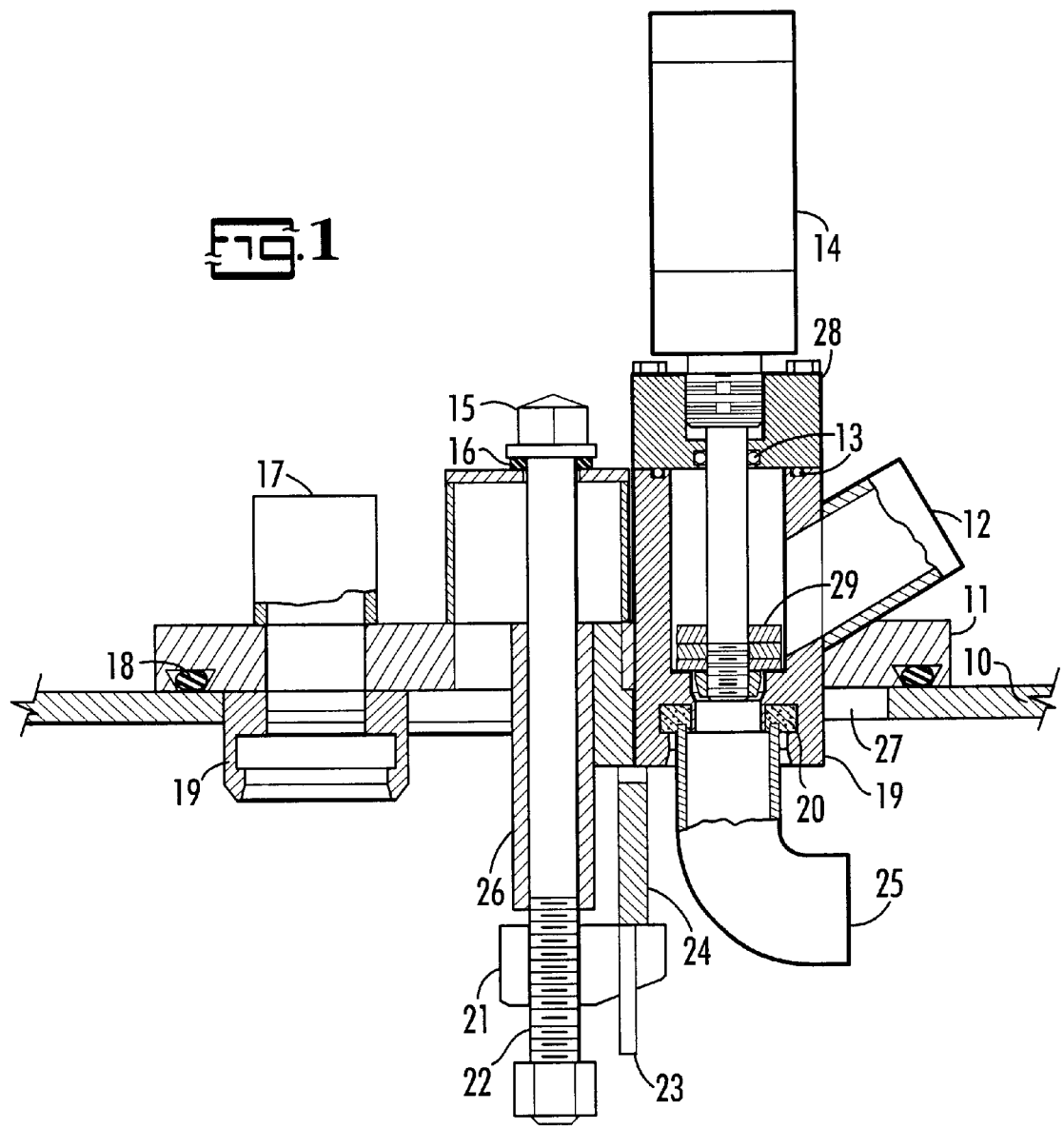
FIG. 1 is a side, cross sectional view of a fillport and container, according to a preferred embodiment of the present invention.
Figure 2:
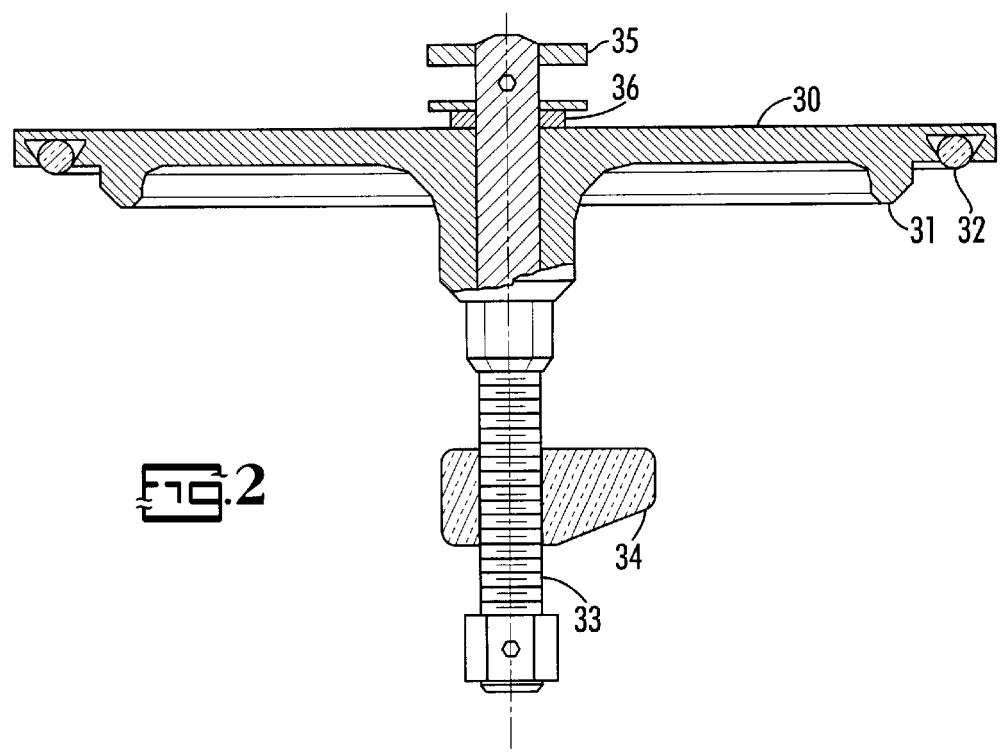
FIG. 2 is a side view of a latching lid that covers a container, according to a preferred embodiment of the present invention.

FIGS. 1 and 2 illustrate a preferred embodiment of the invention. FIG. 1 shows a side sectional view of the fillport mounted to a typical container top. FIG. 2 illustrates the single latching lid that is used to close the container top opening.

The container 10 can be made of plastic or metal and shaped into a cylinder or box having a range of dimensions. The container 10 is provided with an opening 27 for facilitating the filling and dewatering of the contents of container 10. Reusable filter elements 42 (FIG. 3) are connected on the inside of container 10 to a dewatering connection 25. At least one dewatering connection 25 is provided on each container 10; however, as many as four dewatering connections 25 are routinely used. Container 10 is also provided with a latching bar 24 and mechanical stop 23.

A fillport 11 is placed over opening 27 of container 10 and seal guides 19 align fillport 11 with opening 27. Fillport 11 is secured to container 10 by placing a torque wrench (not shown) on drive bolt 15 and using it to tighten a latching bolt 22. A latching lug 21 also rotates along with latching bolt 22 until latching lug 21 hits a stop bar 23. Latching lug 21 then stops rotating with latching bolt 22, causing latching lug 21 to pull fillport 11 down tight against container 10 as latching lug 21 presses against latching bar 24. The torque and moment on latching bolt 22 arc restrained by a bolt alignment tube 26. When the torque wrench reaches a preset torque level, fillport 11 seals to container 10 when seals 16 and 18 are fully compressed. Seals 16 and 18 provide a leak-tight seal during filling and dewatering operations.

The latching action also compresses one or more dewatering seals 20. The compression of dewatering seals 20 allows water to be pumped out of the dewatering filter elements 42 (FIG. 3) through dewatering connection 25 to an external pump or vacuum source (not shown). Fillport 11 is thus attached and sealed to container 10, all achieved merely by tightening drive bolt 15.

Fillport 11 provides an opening 17 for filling container 10. Excess water is removed through dewatering connection 25 to a fillport water outlet 12. Water then flows from water outlet 12 to the pump or vacuum source. For applications that use more than one dewatering connection 25, fillport 11 is provided with an integral valve manifold 28 that allows the operator to select one or more dewatering connections 25 for active dewatering. A piston 29 of actuator cylinder 14 is raised to allow dewatering connection 25 to be in fluid communication with the pump or lowered to close off dewatering connection 25. Seals 13 provided leak protection on valve manifold 28.

Following completion of filling and dewatering operations, fillport 11 is removed by reversing the direction of the torque wrench on drive bolt 15. Latching bolt 22 direction is thereby reversed causing latching lug 21 to disengage from hold down bar 24. When latching lug 21 is totally loosened/extended, latching lug 21 will rotate with latching bolt 22. Fillport 11 is now released and all seals are decompressed. The operator then remotely lifts fillport 11 free of container 10.

Container 10 is now ready to be capped by installation of a lid 30 (FIG. 2). A torque drive tool (not shown) is attached to a lid bolt 35 and lid 30 is remotely placed over opening 27 of container 10. An alignment rib 31 is used to center lid 30 on opening 27 of container 10. The torque drive tool is energized and a latching bolt 33 is rotated so that a lug 34 engages a hold down bar 25 and a stop 23. Lid 30 is then drawn down against container 10. When a specified torque is reached, the drive tool stops, leaving lid 30 fully attached and seals 36 and 32 fully compressed. Lid 30 is removed by simply reversing the torque drive tool and lifting lid 30 off container 10.

The torque drive tool, not shown, is typically a modified electric torque wrench that is mounted to a fixture above fillport 11 or lid 30 so that the tool's drive adapter interfaces with a latch drive bolt 15 or lid bolt 35.

Figure 3:
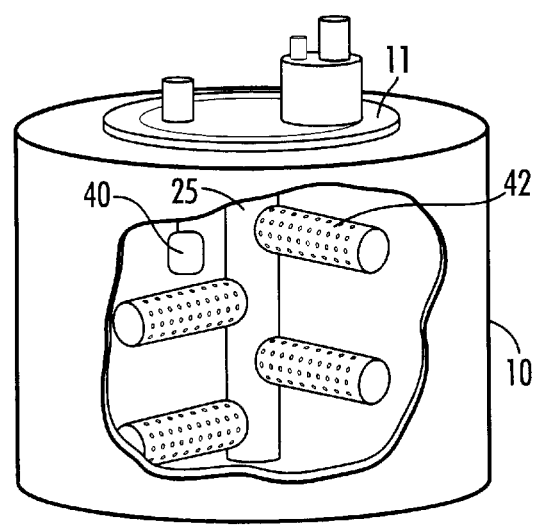
FIG. 3 is a perspective, partially cut away view of a container with filter elements and level sensor, according to a preferred embodiment of the present invention.

A level switch 40 monitors the level in container 10 (FIG. 3). Typically level switch 40 is a float type or conductivity type device. The present invention's fillport 10 uses an ultrasonic type level switch 40 that has no moving parts and is therefore resistant to fouling in order to provide high level protection. The previously used conductivity switch is easily fouled and the float type instrument is unreliable due to waste binding the float to the stem.

Significant advantages of this design include the following. Fillport 11 is small in size and light in weight. Lid 30 can be made of aluminum and weighs less than 3 pounds. Such a light lid allows a single operator to install lid 30 using a reach pole with torque drive tool and lid 30 attached to its distal end. This allows the operator to cover container 10 without dressing out in special anti-contamination clothing and also eliminates the need for a crane. Lid 30 and the tool are also very economical. The scaled connections can be connected and disconnected without the need for operator action. By simply selecting the direction of rotation of the torque drive tool and then energizing it, the engagement, alignment and sealing of fillport 11 to container 10 and lid 30 to fillport 11 can be accomplished with no hands-on operator interaction.

To regenerate the filter elements 42 (FIG. 3), fillport 11 is placed on container 10 and a strong air and/or water pulse is directed in reverse flow through an outlet 12 through dewatering connections 25 to the filters. The reverse flow of fluid blows off any accumulated waste that is plugging the external surface of filter elements 42. The cleaned filter elements 42 are then ready for reuse.

In the foregoing preferred embodiment, the latching mechanism described is based on a single threaded bolt. It will be clear to those skilled in the mechanical, electromechanical and hydraulic and pneumatic arts, that other latching mechanisms can easily be envisioned, such as a simple air cylinder on fillport 11, that can provide an equivalent single latching mechanism—that is, a latching mechanism that secures fillport 11 to container 10 in one step—when used in combination with lug 34 and hold down bar 25.

It will be apparent to those skilled in the art of radioactive waste processing and handling that many modifications and substitutions may be made to the preferred embodiment just of the present invention, which is defined by the appended claims.

What is claimed is:

1. A device for dewatering and shipping wastes, comprising:

a container having an opening;

a filter carried within said container;

a bar carried within said container;

a lid dimensioned to fit over said opening;

means carried by said lid for engaging said bar to secure said lid to said container, said engaging means operable from outside said container; and a fillport dimensioned to fit over said opening when said lid is not on said container, said fillport having first means formed there in for permitting said container to be filled and second means formed therein and in fluid communication with filter for permitting water to be removed from said container, said fillport having drive means for engaging said bar to secure said fillport to said container over said opening, said drive means operable from outside said container.

2. The device as recited in claim 1, wherein said engaging means of said lid is a bolt and a lug carried by said bolt.

3. The device as recited in claim 1, wherein said drive means is a drive bolt and a lug carried by said drive bolt.

4. The device as recited in claim 1, further comprising a level switch carried by said fillport.

5. The device as recited in claim 1, further comprising an ultrasonic level switch carried by said fillport.

6. A device for dewatering and shipping wastes, comprising:

a container having an opening;

a filter carried within said container;

a bar carried within said container;

a fillport dimensioned to fit over said opening, said fillport having first means formed there in for permitting said container to be filled and second means formed therein and in fluid communication with filter for permitting water to be removed from said container, said fillport having drive means for engaging said bar to secure said fillport to said container over said opening; and switch means carried by said fillport for sensing levels inside said container.

7. The device as recited in claim 6, wherein said switch means is an ultrasonic switch.

8. The device as recited in claim 6, wherein said drive means is a bolt carrying a lug, said lug engaging said bar when said bolt is rotated to tighten said fillport to said container.

9. The device as recited in claim 6, wherein said drive means operable from outside said container.

10. The device as recited in claim 6, wherein said drive means further comprises:

a drive bolt carrying a lug; and a drive bolt alignment tube, said drive bolt rotatable within said drive bolt alignment tube.

11. The device as recited in claim 6, wherein said bar includes a stop, and said drive means includes a drive bolt carrying a lug that engages said stop when said drive bolt is rotated.

12. A device for dewatering and shipping wastes, comprising:

a container having an opening;

a filter carried within said container;

a bar carried within said container; and a fillport dimensioned to fit over said opening, said fillport having first means formed there in for permitting said container to be filled and second means formed therein and in fluid communication with filter for permitting water to be removed from said container, said fillport having drive means for engaging said bar to secure said fillport to said container over said opening when said drive means is rotated into engagement with said bar.

13. The device as recited in claim 12, wherein said filter is adapted to be backwashed.

14. The device as recited in claim 12, wherein said drive means can be rotated from outside said container.

15. The device as recited in claim 12, wherein said drive means further comprises a drive bolt carrying a lug, said drive bolt being rotatable, said lug being rotatable with said drive bolt into engagement with said bar.

16. The device as recited in claim 15, wherein said bar includes a stop and said lug is stopped from rotating when said drive means rotates said lug into said stop.

17. The device as recited in claim 12, further comprising a level switch.

18. The device as recited in claim 17, wherein said level switch is an ultrasonic level switch.

19. The device as recited in claim 12, wherein said drive means is a single latching mechanism.

\* \* \* \* \*